United States Patent
Wendt et al.

(10) Patent No.: US 7,062,914 B2
(45) Date of Patent: Jun. 20, 2006

(54) HEAT ENGINES AND ASSOCIATED METHODS OF PRODUCING MECHANICAL ENERGY AND THEIR APPLICATION TO VEHICLES

(75) Inventors: Michael Wendt, Pinjarra Hills (AU); Shi Su, Pinjarra Hills (AU); Patrick J. Glynn, Pinjarra Hills (AU)

(73) Assignee: Commonwealth Scientific and Industrial Research Organization, Campbell (AU)

( * ) Notice: Subject to any disclaimer, the term of this patent is extended or adjusted under 35 U.S.C. 154(b) by 79 days.

(21) Appl. No.: 10/297,093

(22) PCT Filed: May 30, 2001

(86) PCT No.: PCT/AU01/00639

§ 371 (c)(1),
(2), (4) Date: Oct. 15, 2003

(87) PCT Pub. No.: WO01/92701

PCT Pub. Date: Dec. 6, 2001

(65) Prior Publication Data

US 2004/0050049 A1    Mar. 18, 2004

(30) Foreign Application Priority Data

May 30, 2000   (AU) .................................. PQ7850

(51) Int. Cl.
*F01K 1/00* (2006.01)
(52) U.S. Cl. .......................... 60/659; 60/670
(58) Field of Classification Search ............... 60/641.1, 60/641.8, 641.11, 641.15, 398, 659, 670, 60/682
See application file for complete search history.

(56) References Cited

U.S. PATENT DOCUMENTS

| 3,080,706 A |   | 3/1963  | Flynn et al. |
|---|---|---|---|
| 3,699,681 A |   | 10/1972 | Frutschi |
| 3,932,996 A | * | 1/1976  | Bammert et al. ............. 60/650 |
| 4,041,707 A | * | 8/1977  | Spector .................... 60/641.14 |
| 4,055,950 A | * | 11/1977 | Grossman .................... 60/398 |
| 4,086,958 A |   | 5/1978  | Lindner et al. |
| 4,126,995 A |   | 11/1978 | Asselman et al. |
| 4,148,191 A |   | 4/1979  | Frutschi |
| 4,193,266 A |   | 3/1980  | Frutschi |

(Continued)

FOREIGN PATENT DOCUMENTS

AU       24086 A       6/1999

(Continued)

OTHER PUBLICATIONS

International Search Report for PCT/AU01/00639, dated Aug. 9, 2001.

*Primary Examiner*—Hoang Nguyen
(74) *Attorney, Agent, or Firm*—Sughrue Mion, PLLC (57) ABSTRACT

A closed cycle gas turbine system (40) comprising system comprising a compressor (52) for producing compressed gas, a gas turbine (42) for receiving the compressed gas, a heat storage means (44) having a first heat transfer means and adapted to receive the compressed gas from the compressor (52) and transmit the compressed gas to the gas turbine (42) and a second heat transfer means (46) for receiving exhaust gas from the gas turbine (42) and transmitting it to the compressor (52) and wherein the second heat transfer means (46) is adapted to transfer at least some heat from the exhaust gas prior to it being transferred to the compressor (52).

33 Claims, 3 Drawing Sheets

U.S. PATENT DOCUMENTS

| | | |
|---|---|---|
| 4,219,072 A | 8/1980 | Barlow, Sr. |
| 4,416,114 A | 11/1983 | Martini |
| 4,484,566 A | 11/1984 | Gonzalez |
| 4,583,368 A * | 4/1986 | Neuenschwander .......... 60/639 |
| 4,802,445 A * | 2/1989 | Robertson, Jr. ............ 122/4 D |
| 4,894,989 A | 1/1990 | Mizuno et al. |
| 5,507,141 A * | 4/1996 | Stigsson ...................... 60/775 |
| 5,778,675 A * | 7/1998 | Nakhamkin .................. 60/652 |
| 6,107,693 A * | 8/2000 | Mongia et al. ............... 290/52 |
| 6,272,839 B1 * | 8/2001 | Karl ............................. 60/783 |
| 6,651,435 B1 * | 11/2003 | Johnston .................. 60/641.11 |

FOREIGN PATENT DOCUMENTS

| | | |
|---|---|---|
| DE | 19938023 A1 | 4/2000 |
| JP | 08-068341 A | 3/1996 |
| JP | 2000-154733 A | 6/2000 |
| WO | WO 01/21948 A1 | 3/2001 |

* cited by examiner

HEAT ENGINES AND ASSOCIATED METHODS OF PRODUCING MECHANICAL ENERGY AND THEIR APPLICATION TO VEHICLES

FIELD OF THE INVENTION

The present invention relates to heat engines, in particular engines which operate in accordance with the Carnot and Brayton cycles. More specifically, the present invention relates to new applications of these engines.

BACKGROUND TO THE INVENTION

One of the dangers of underground mining is that if part of the mine collapses people who are working underground may be crushed or suffocated. Suffocation in such a situation can occur because personnel are enclosed in a confined space so that they only have a limited supply of oxygen. However, because it is typically necessary to provide a constant supply of oxygen to tunnels which run through an underground mine, suffocation can also occur if the supply of oxygen to a tunnel is cut off.

It is therefore important to evacuate persons that have been trapped underground as a result of a collapse in a mine, as quickly as possible. One way of facilitating quick evacuation is to have a vehicle on standby which is capable of going down into the mine and rescuing survivors. These vehicles are typically referred to as MRVs. However, because oxygen is typically in short supply in the event of a collapse it is important that these vehicles are capable of operating in an oxygen depleted or free environment.

It is therefore desirable to provide an engine which is capable of operating in an oxygen depleted or free environment. It is also desirable to provide a vehicle which is capable of operating in an oxygen free or depleted environment.

SUMMARY OF THE INVENTION

In a first aspect the present invention provides a reciprocating engine comprising a compartment having two adjacent first and second sub compartments and at least one moveable partition, the at least one moveable partition being arranged for movement to vary the volume of the adjacent sub compartments, the engine including heat storage means for heating a first gas which is contained within the first sub compartment relative to a second gas which is contained within the second sub compartment, the engine including first heat transferral means for transferral of heat from the heat storage means to the first gas, the at least one moveable partition being arranged to cyclically vary the volume in the adjacent sub compartments as a result of heating of the first gas and consequently produce mechanical energy, wherein the engine includes gas cycling means for cycling the first gas cyclically from the first adjacent sub compartment to the first heat transferral means.

In a second aspect the present invention provides a method of producing mechanical energy, the method comprising the steps of:
(a) providing a reciprocating engine comprising a compartment having two adjacent sub compartments and at least one moveable partition, the at least one moveable partition being arranged for movement to vary the volume of the sub compartments, the engine including heat storage means for heating a first gas which is contained within a first adjacent sub compartment relative to a second gas which is contained within a second adjacent sub compartment, the engine including first heat transfer means for transferral of heat from the heat storage means to the first gas, the at least one moveable partition being arranged to cyclically vary the volume in the adjacent sub compartments as a result of heating of the first gas and consequently produce mechanical energy; and
(b) cycling the first gas from the first adjacent sub compartment to the first heat transferral means.

In a third aspect the present invention provides a closed cycle gas turbine engine comprising a compressor for compressing gas which is fed into an inlet side of the turbine, and heat storage means and associated first heat transfer means for transferring heat from the heat storage means to the gas either prior to it entering the turbine or upon entry of the gas to the turbine, the gas turbine engine being arranged to feed exhaust gas of the gas turbine into the compressor, wherein the engine includes second heat transfer means for transferring heat from the exhaust gas to the compressed gas, prior to it being pumped through the first heat transfer means.

In a fourth aspect the present invention provides a closed cycle gas turbine engine comprising a compressor for compressing gas which is fed into an inlet side of the turbine, and heat storage means and associated primary heat transfer means for transferring heat from the heat storage means to the gas either prior to it entering the turbine or upon entry of the gas to the turbine, the gas turbine engine being arranged to feed exhaust gas of the gas turbine into the compressor, wherein the engine includes secondary heat transfer means for removal of heat from the exhaust gas prior to it being pumped through the compressor.

In a fifth aspect the present invention provides a method of producing mechanical energy, the method comprising the steps of:
(a) providing a closed cycle gas turbine engine comprising a compressor for compressing gas which is fed into an inlet side of the turbine, and heat storage means and associated first heat transfer means for transferring heat from the heat storage means to the gas either prior to it entering the turbine or upon entry of the gas to the turbine, the gas turbine engine being arranged to feed exhaust gas of the gas turbine into the compressor; and
(b) transferring heat from the exhaust gas to the compressed gas prior to it being pumped through the first heat transfer means.

In a sixth aspect the present invention provides a method of producing mechanical energy, the method comprising the steps of:
(a) providing a closed cycle gas turbine engine comprising a compressor for compressing gas which is fed into an inlet side of the turbine, and heat storage means and associated primary heat transfer means for transferring heat from the heat storage means to the gas either prior to it entering the turbine or upon entry of the gas to the turbine, the gas turbine engine being arranged to feed exhaust gas of the gas turbine into the compressor; and
(b) transferring heat from the exhaust gas prior to it being pumped through the compressor.

In a seventh aspect the present invention provides a vehicle including a land vehicle, marine vehicle or aircraft wherein the vehicle includes the engine of the first, third or fourth aspect of the present invention.

According to a further aspect of the present invention there is provided a reciprocating engine comprising a container having a compartment with adjacent first and second sub-compartments, separated by a moveable partition, an inlet and an outlet, a heat storage means, a heat transfer means and a conduit system interconnecting the outlet with the heat transfer means and the heat transfer means with the inlet, wherein heat from the heat storage means is adapted to be transferred by the heat transfer means to gas within the conduit to drive the moveable partition to cyclically vary the volume in the adjacent sub-compartments to enable cyclical circulation of gas through the conduit system and the production of mechanical or electrical energy.

Preferably the reciprocating engine operates in accordance with the sterling cycle which is composed of four distinct thermodynamic processes which include isothermal compression, constant volume heating, isothermal expansion and constant volume cooling.

It is preferred that the conduit system comprises a conduit connected at one end to the outlet which is located at an approximate mid-point of the container and at its opposite end to the heat transfer means.

Preferably the conduit system also includes a conduit connected to the inlet which is located at one end of the container and at the opposite end to an outlet of the heat transfer means.

It is preferred that a regenerator is connected in the conduit system between the heat transfer means and the outlet of the cylinder.

The vehicle may include a MRV.

The heat storage means may be a heat storage cell.

The heat storage cell may be a liquid salt heat storage cell.

The liquid salt heat storage cell may be a sodium chloride (NACL), lithium fluoride (LIF), or sodium fluoride (NAF) liquid salt heat storage cell.

The liquid salt heat storage cell used to power an MRV is preferably capable of providing 1000 KW of stored energy at a temperature ranging from 650 to 1000 degrees C. The preferred weight of the NACL, LIF or NAF liquid salt heat storage cell is therefore 3.96, 2.35 or 2.97 tonnes respectively.

The heat storage means may be arranged to maintain the first gas of the reciprocating engine at a temperature of approximately 650° C.

The reciprocating engine may include second heat transferral means for transferral of heat from the second adjacent compartment.

The second heat transferral means may be arranged to maintain the second adjacent sub compartment at a temperature of approximately 15° C.

Alternatively, the heat storage means and first heat transferral means may be arranged to maintain the first adjacent sub compartment of the reciprocating engine at a temperature of greater than approximately 700° C. and the second heat transferral means may be arranged to maintain the second adjacent compartment of the reciprocating engine at approximately room temperature.

The first heat transferral means may include a first heat exchanger.

The first heat exchanger may be formed out of incanel or 253 temperature resistant stainless steel.

The second heat transferral means may include a second heat exchanger.

The method of the second aspect of the present invention may further include the step of heating the first adjacent sub compartment so that the temperature of the first adjacent sub compartment is 600° C. hotter than the second adjacent sub compartment.

The first and/or second heat exchanger may include a third gas.

The first and second gases may be the same as the third gas.

The first and second gases may be Air, Ammonia, Argon, Carbon Dioxide, Carbon Monoxide, Helium, Hydrogen, Methane, Oxygen, or Water Vapour and are preferably helium.

If the first and second gases are different to the third gas, the third gas is preferably Hydrogen.

The third gas may comprise the first gas wherein the first heat exchanger operates by passage of the first gas through the first heat exchanger.

The third gas is preferably high-pressure gas having a pressure ranging from approximately 15 megapascals to 25 megapascals.

The gas cycling means may include a pipe.

The reciprocating engine may include a regenerator, the regenerator comprising heat absorption and release means for cyclically absorbing heat from the first gas and subsequently transferring heat to the first gas upon cooling of the first gas.

The regenerator may further include a first and second adjacent compartment connecting portion which is arranged to transfer the first and second gases between the first and second adjacent sub compartments.

Alternatively, the regenerator may further include a heat absorbing member and a pipe, the pipe being arranged to transfer the first gas from one part of the first adjacent sub compartment, through the heat absorbing member, and subsequently to another part of the first adjacent sub compartment.

The reciprocating engine may include combined gas cycling and regenerator means for performing the combined function of the gas cycling means and the regenerator, the combined gas cycling and regenerator means having the heat absorption and release means of the regenerator and the first heat exchanger of the first heat transferral means, the combined gas cycling and regenerator means being arranged to pass the first gas sequentially through the heat absorption and release means, and first heat exchanger prior to reentering the first adjacent sub compartment.

The first gas may be arranged to cycle from the first adjacent sub compartment to the first heat transferral means, heat absorption and release means, or combined first gas cycling and regenerator means under buoyancy effects of heat to result in the first gas being cycled to and from the first adjacent sub compartment by convection.

The reciprocating engine may include pump means for pumping the first gas to and/or from the first heat transferral means, heat absorption and release means, or combined gas cycling and regenerator means.

The at least one moveable partition may be a single moveable partition which is arranged to divide the compartment into the two adjacent sub compartments, the single moveable partition being arranged to substantially sealingly engage the compartment so that the first gas is prevented from mixing with the second gas.

The compartment may be an elongated compartment and the single moveable partition may be orientated substantially transversely to a longitudinal axis of the compartment and arranged to move along the longitudinal length of the compartment.

The reciprocating engine may include a displacer for displacement of the first gas, the displacer being arranged to move in relationship with the at least one moveable partition.

The displacer may be arranged to move within the elongated compartment and may be arranged to move along the longitudinal length of the compartment, the displacer being arranged to move 90° out of phase to the single moveable partition.

Alternatively, the at least one moveable partition may comprise first and second moveable partitions which are arranged to substantially sealingly engage the first and second adjacent sub compartments respectively, the first and second gases being free to mix.

The first and second gases may be free to mix by passage through a regenerator.

The method of the second aspect of the present invention may further include the step of cycling the first gas out of the first adjacent sub compartment, through the first heat exchanger and subsequently back into the first adjacent sub compartment.

The method of the second aspect of the present invention may further include the step of cycling the first gas through the regenerator prior to the passage of the first gas through the first heat exchanger.

The method of the second aspect of the present invention may further include the step of cycling the first gas under buoyancy effects of heat to result in the first gas being cycled by convection.

Alternatively, the method of the second aspect of the present invention may further include the step of pumping the first gas through the first heat exchanger and/or regenerator.

The gas cycling means may include flow control means for controlling the flowrate of the first gas cycling from the first adjacent sub compartment to the first heat transferral means.

The flow control means is preferably arranged to control the flowrate of the first gas cycling from the first adjacent sub compartment rather than controlling the flowrate of the first gas which is returning to the first adjacent sub compartment.

The flow control means is preferably arranged to control the flowrate of the first gas cycling to the regenerator.

The flow control means may comprise a valve.

The flow control means may comprise a butterfly valve.

The method the second aspect of the present invention may further include the step of controlling the flowrate of the first gas which cycles from the first adjacent sub compartment to the first heat transferral means.

The method of the second aspect of the present invention may further include the step of controlling the flowrate of the gas which cycles from the first adjacent sub compartment to the first heat transferral means via the flow control means.

The third aspect of the present invention may include the secondary heat transfer means.

The fourth aspect of the present invention may include the second heat transfer means.

The fifth aspect of the present invention may further include the step of transferring heat from the exhaust gas prior to it being pumped through the compressor.

The sixth aspect of the present invention may further include the step of transferring heat from the exhaust gas to the compressed gas prior to it being pumped through the primary heat transfer means.

According to a further aspect of the present invention there is provided a closed cycle gas turbine system comprising a compressor for producing compressed gas, a gas turbine for receiving the compressed gas, a heat storage means having a first heat transfer means and adapted to receive the compressed gas from the compressor and transfer the compressed gas to the gas turbine, a second heat transfer means for receiving exhaust from the gas turbine and transmitting it to the compressor and wherein the second heat transfer means is adapted to transfer heat from the exhaust gas prior to it being transferred to the compressor.

Preferably the second heat transfer means is adapted to transfer heat from the exhaust gas to the compressed gas prior to it being received by the heat storage means.

Preferably the second heat transfer means comprises a heat exchanger.

The second heat transfer means may include a recuperator.

The compressor of the gas turbine engine may be arranged to compress the gas according to the ratio of 6.2:1.

The heat storage means and associated first and primary heat transfer means of the gas turbine engine may be arranged to maintain the temperature of gas entering the gas turbine at a relatively constant temperature of approximately 930° C.

The gas turbine engine may be a humid gas turbine engine which includes liquid injection means for injecting liquid into the compressed gas after it leaves the compressor and before it is heated by the first or primary heat transfer means, and liquid condensing means for subsequently condensing liquid from the exhaust gas prior to it being fed into the compressor.

The liquid may be condensed from the exhaust gas either before or after the exhaust gas passes through the secondary heat transfer means.

The liquid injected by the liquid injection means may be selected so that the liquid condensing means is not required because the liquid automatically condenses from the exhaust gas.

The liquid injected by the liquid injection means may be selected so that the second heat transfer means reduces the temperature of the exhaust gas to approximately ambient temperature prior to it passing into the compressor, without the use of the secondary heat transfer means.

The liquid may comprise water and preferably comprises distilled water.

The compressor of the humid gas turbine engine is preferably arranged to compress the gas according to a ratio greater than or equal to approximately 15:1.

The compressor may be arranged to compress the gas according to a ratio of less than or equal to approximately 30:1.

The gas turbine may be greater than or equal to a 1MW turbine.

The compressor and first or primary heat transfer means may be arranged so that the temperature of the compressed gas exiting the compressor is approximately 400° C. and so that the liquid injection means reduces the temperature of the compressed gas to approximately 195° C.

The methods of the fifth and sixth aspects of the present invention may further include the step of heating the gas either prior to the gas entering the gas turbine or upon entry of the gas to the gas turbine to maintain the temperature of gas entering the gas turbine at a relatively constant temperature of approximately 930° C.

The methods of the fifth and sixth aspects of the present invention may further include the steps of:
 (a) injecting liquid into the compressed gas after it leaves the compressor and before it is heated by the first or primary heat transfer means; and
 (b) condensing the liquid from the exhaust gas prior to it being feed into the compressor.

The first and primary heat transfer means may each include a primary heat exchanger, the primary heat exchanger being arranged to transfer heat from the heat storage means to the compressed gas upon pumping of the compressed gas through the primary heat exchanger, the compressor being arranged to pump the compressed gas through the primary heat exchanger.

Compressed gasses having a high specific heat capacity result in high power output from the gas turbine engine, however they are not as efficient as gasses with lower specific heat capacities because they retain more heat when exhausted from the turbine. Therefore, the gas of the gas turbine engine may be Air, Ammonia, Argon, Carbon Dioxide, Carbon Monoxide, Helium, Hydrogen, Methane, Oxygen, or Water Vapour and is preferably helium.

The primary heat exchanger may be arranged to raise the temperature of the compressed gas to greater than or equal to approximately 900° C.

The methods of the fifth and sixth aspects of the present invention may further include the step of transferring heat from the heat storage means to the compressed gas using the primary heat exchanger.

The second heat transfer means may be arranged to decrease the temperature of the exhaust gas to approximately 200° C. and increase the temperature of gas exiting the compressor to approximately 400° C.

The second heat transfer means may include a recuperator.

The recuperator may include a secondary heat exchanger.

The secondary heat transfer means may be arranged to remove heat from the exhaust gas after the exhaust gas has passed through the second heat transfer means.

The secondary heat transfer means may be arranged to decrease the temperature of the exhaust gas to approximately 30° C.

The secondary heat transfer means may include a tertiary heat exchanger.

The tertiary heat exchanger may include liquid cooling means for passage of cooling liquid through the tertiary heat exchanger for removal of heat from the exhaust gas.

The methods of the fifth and sixth aspects of the present invention may further include the step of transferring heat from the exhaust gas to the compressed gas prior to the compressed gas being pumped through the first or primary heat transfer means using the recuperator.

The methods of the fifth and sixth aspects of the present invention may further include the step of transferring heat from the exhaust gas prior to the exhaust gas being pumped through the compressor using the tertiary heat exchanger.

The gas turbine engine of the third and fourth aspects of the present invention may further include gas flowrate control means for controlling the flowrate of gas flowing through the gas turbine engine.

The gas flowrate control means may be arranged to throttle the gas turbine engine to control its power output by restricting the flowrate of gas flowing through the gas turbine engine.

The gas flowrate control means may include a valve.

The gas flowrate control means may be positioned to control the flowrate of gas flowing between the secondary heat transfer means and the compressor.

The method of the fifth and sixth aspects of the present invention may further include the step of controlling the flowrate of gas flowing through the gas turbine engine to throttle the gas turbine engine and control its power output.

The method of the fifth and sixth aspects of the present invention may further include the step of controlling the flowrate of gas flowing through the gas turbine engine using the gas flowrate control means.

The gas turbine engine of the third and fourth aspects of the present invention may further include liquid flowrate control means for controlling the flowrate of liquid which is injected into the compressed gas by the liquid injection means, to control the power output of the gas turbine engine.

The liquid flowrate control means may comprise a proportional integral differential (P.I.D.) controller.

The P.I.D. controller may be arranged to control the flowrate of the liquid which is injected into the compressed gas in proportion to the flowrate of the compressed gas.

The P.I.D. controller may be arranged to control the power output of the gas turbine engine by controlling both the flowrate of the gas flowing through the gas turbine and the flowrate of the liquid which is injected in to the compressed gas by the liquid injection means.

The method of the fifth and sixth aspects of the present invention may further include the step of controlling the flowrate of liquid being injected into the compressed gas to control the power output of the gas turbine engine.

The method of the fifth and sixth aspects of the present invention may further include the step of controlling the flowrate of liquid which is injected into the compressed gas using the liquid flowrate control means.

The reciprocating and gas turbine engines of the first, third and fourth aspects of the present invention may each be arranged to drive a hydraulic pump/motor, generator, mechanical transfer means for the transferral of mechanical energy, or one or more of the these in combination for controlling mechanical output from these engines.

The generator may be arranged to charge electrical storage means which may in turn be arranged to power an electric motor.

Alternatively, the generator is preferably arranged to directly drive an electric motor.

The hydraulic pump/motor may be arranged to drive the vehicle through hydraulic motors.

The reciprocating and gas turbine engines may each be arranged to drive a gearbox.

The gearbox of the gas turbine engine may have a step down ratio of approximately 6:1. The step down ratio of 6:1 may correspond to 35000 rpm: 6000 rpm.

The gas turbine engine may be arranged to drive a wobble plate type hydraulic pump.

The vehicle may include the hydraulic pump/motor, generator, mechanical transfer means for the transferral of mechanical energy, or one or more of these in combination for controlling mechanical output from the reciprocating or gas turbine engine.

The vehicle may also include the gearbox and a vehicle being powered by the gas turbine engine may also include the wobble plate type hydraulic pump.

The gearbox of the vehicle may be arranged to drive the hydraulic pump.

According to another aspect of the present invention there is provided heat storage device comprising a container with an inlet, an outlet, a heat storage substance and a heat transfer means, which is adapted to transmit fluid into the container for passage through the heat storage substance and discharge the fluid through the outlet.

Preferably the fluid is a gas.

The heat storage substance may comprise a molten chemical compound such as lithium chloride.

The fluid may be bubbled from the bottom of the container through the heat storage substance and out through the outlet.

The heat transfer means may comprise at least one conduit with at least one outlet opening located at the bottom of the container.

In the preceding summary of the invention, except where the context requires otherwise, due to express language or necessary implication, the words "comprising", "comprises", or "comprise" are used in the sense of "including"; that is, the features specified may be associated with further features in various embodiments of the invention.

BRIEF DESCRIPTION OF THE DRAWINGS

A preferred embodiment of the present invention will now be described, by way of example only, with reference to the following drawings in which.

BEST MODE FOR CARRYING OUT THE INVENTION

Figure 1:
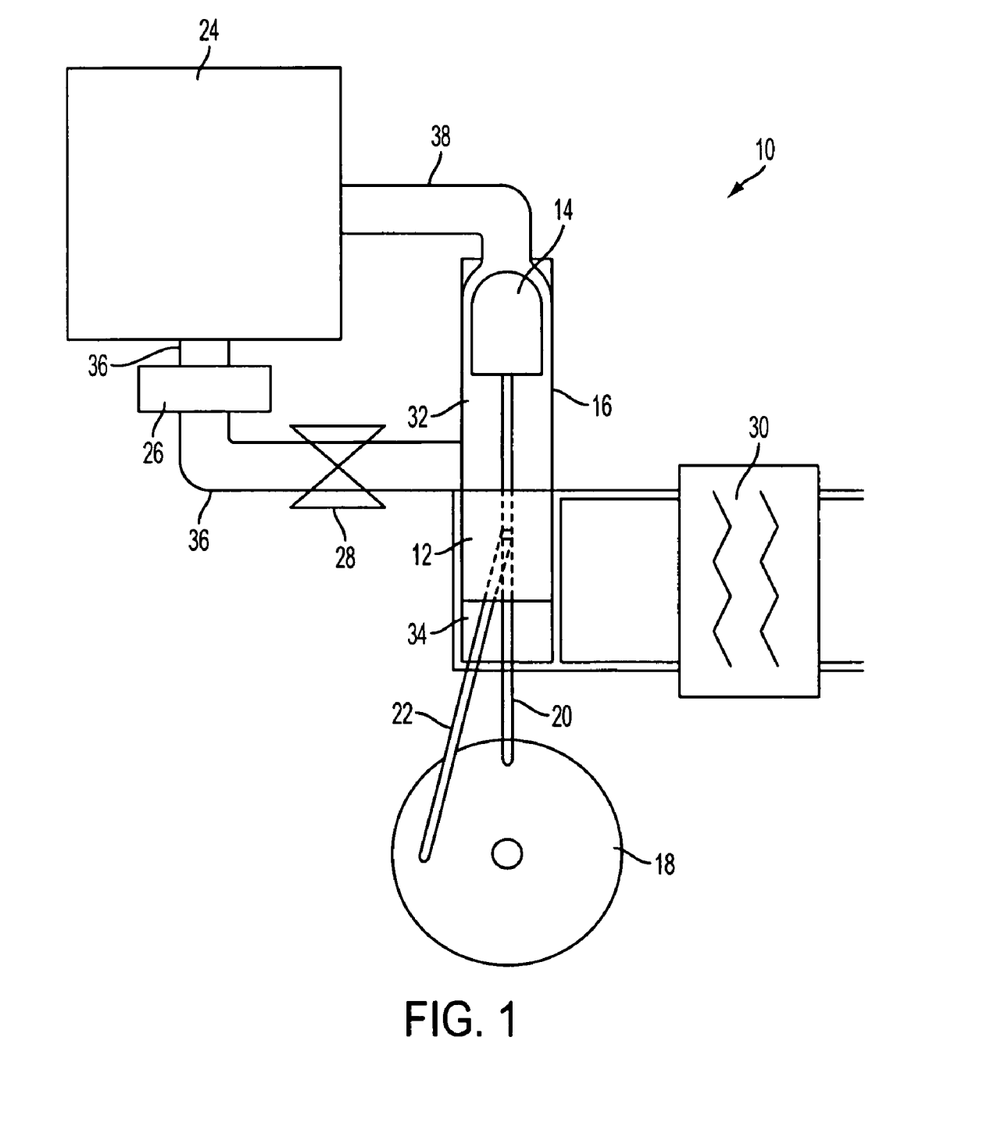
FIG. 1 is a schematic sectional view of one example of a reciprocating engine of the present invention.

Referring to FIG. 1, a reciprocating engine 10 generally comprises a piston 12, displacer 14, cylinder 16, flywheel 18, connecting rods 20 and 22, a liquid salt heat cell and associated heat exchanger 24, a regenerator 26, a butterfly valve 28 and a heat exchanger 30. The piston 12 is designed to slide up and down along the longitudinal length of the cylinder 16. An external cylindrical surface of the piston 12 seals against an inner cylindrical surface of the cylinder 16. The displacer 14 is a similar shape to the piston 12 although it's upper surface is hemispherical to correspond to an upper inner surface of the cylinder 16. Unlike the piston 12, the displacer 14 does not seal against an inside cylindrical surface of cylinder 16. The displacer 14 is designed to move upwardly and downwardly along the longitudinal length of the cylinder 16. The movement of the displacer 14 and piston 12 relative to each other is controlled by their connection the flywheel 18. The piston 12 is connected to the flywheel by the connecting rod 22 while the displacer 14 is connected to the flywheel 18 by the connecting rod 20. The connecting rods 20 and 22 are attached to the flywheel 18 so that the piston 12 and displacer 14 move within the cylinder 16 90° out of phase relative to each other.

Piston 12 divides the cylinder 16 into upper and lower ends or compartments 32 and 34 respectively. Helium gas is contained within both the upper and lower ends 32 and 34. The helium gas is also free to flow through cold and hot pipes 36 and 38 respectively which enable helium gas from the cylinder 16 to flow through the regenerator 26, and the liquid salt heat cell and associated heat exchanger 24. The cold pipe 36 extends approximately perpendicularly from the cylinder 16, about half way along the longitudinal length of the cylinder 16 while the hot pipe 38 extends upwardly of an up surface of the cylinder 16. The cold pipe 36 connects the cylinder 16 with the regenerator 26 while the hot pipe 38 connects the cylinder 16 with the liquid salt heat cell and associated heat exchanger 24. The cold pipe 36 also continues beyond the regenerator 26 to connect the regenerator 26 with the liquid salt heat cell and associated heat exchanger 24.

The lower half of the cylinder 16 is attached to the heat exchanger 30 which is designed to remove heat from the lower half of the cylinder 16. The liquid salt heat cell and associated heat exchanger 24, in conjunction with the regenerator 26 and cold and hot pipes 36 and 38 are designed to heat the helium gas which is contained within the upper end 32 of the cylinder 16. By heating the gas which is in the upper end 32 of the cylinder 16 and cooling the gas which is in the lower end 34 of the cylinder 16 the piston 12 reciprocates upwardly and downwardly within the cylinder 16 in accordance with the theoretical carnotcycle. The movement of the piston 12 results in rotation of the fly wheel 18. The engine 10 is therefore capable of converting heat energy into mechanical energy.

While the piston 12 and displacer 14 are connected to the flywheel 18, the moving piston 12 and displacer 14 could be used to produce electrical energy rather than mechanical energy. This alternative would be possible by for example, attaching magnets to a rod such as the connecting rod 20 and allowing the rod to move forward and backward through a coil. This alternative option would however require a spring or like item which is capable of initiating the upward movement of the piston 12. In the case of the embodiment depicted in FIG. 1, this upward movement is provided by the momentum of the flywheel 18.

The reciprocating motion of the piston 12 and displacer 14 occurs as a result of the following cycle. Helium gas from the upper end 32 of the cylinder 16 passes through the cold pipe 36, through the regenerator 26, and into the liquid salt heat cell and associated heat exchanger 24. The heat exchanger that is associated with the liquid salt heat cell is designed to transfer heat from the liquid salt heat cell to the gas which passes through the heat exchanger. As the helium gas passes through the heat exchanger it is therefore heated and subsequently flows through the hot pipe 38 and into the upper end of the cylinder 16. The hot helium gas is able to flow down through the upper end 32 of the cylinder 16, between an outer side wall of the displacer 14 and an inner side surface of the cylinder 16. The hot gas 32 therefore fills the upper end 32 of the cylinder 16. Expansion of the hot helium gas results in forces being applied to both the piston 12 and displacer 14 and subsequent downward movement of the piston 12 and displacer 14. As the piston 12 and displacer 14 move downwardly the hot gas cools as a result of the work that it has done on the piston 12 and displacer 14. As the gas is cooling it passes through the cold pipe 36 and into the regenerator 26. A generator is designed to absorb heat from the gas which passes through it. As the movement of the piston 12 and displacer 14 continues within the cylinder 16 the gas within the cylinder 16 cools further. When the piston 12 is at its lower most point within the cylinder 16 the cooling of the gas within the upper end 32 of the cylinder 16 results in a vacuum being created and the piston 12 being drawn upwardly within the cylinder 16. The upward movement of the piston 12 is also facilitated by the momentum of the flywheel 18. As the piston 12 moves upwardly, the cool gas which is contained within the upper end 32 of the cylinder 16 passes out of the upper end 32 of the cylinder 16, through the cold pipe 36 and subsequently through the regenerator 26. As the cold gas passes through the regenerator 26 it absorbs heat from the regenerator 26 which has been absorbed from gas within the cylinder 16 in a previous part of the cycle. The gas passing through the cold pipe 36 is therefore preheated in the regenerator 26 prior to passing through the heat exchanger which is associated with the liquid salt heat cell. As the gas passes through the heat exchanger associated with the liquid salt heat cell it is heated and as previously explained then passes through the hot pipe 38 and into the upper end of the cylinder 16 to continue the cycle.

The power output from the engine 10 can be controlled via the butterfly valve 28. A butterfly valve 28 can be used to restrict the flowrate of gas flowing through the cold pipe 36 thereby restricting the rate at which hot gas enters the upper end 32 of the cylinder 16. Such restriction of the flowrate of gas into the cylinder 16 results in the power output from the engine 10 being reduced or throttled. The butterfly valve 28 can therefore be used to increase or decrease the power output from the engine 10.

The displacer 14 has three main functions. It provides some downward force which assists in rotating the flywheel, the rotation of which provides momentum to the downward movement of the piston 12. It also reduces the volume of the upper end 32 of the cylinder 16 meaning that less expansion of hot gas is required to drive the piston 12 downwardly. Finally, it acts as a heat sink which means that it assists in heating the gas in the upper end 32 of the cylinder 16.

The liquid salt heat cell is a sodium fluoride liquid salt heat cell having a weight of approximately 2.97 tonnes. The liquid salt heat cell and associated heat exchanger 24 and regenerator 26 are designed for the engine 10 so that the temperature and pressure within the regenerator 26, and liquid salt heat cell and associated heat exchanger 24 do not exceed approximately 800° C., and between 15 and 25 megapascals respectively.

A reciprocating engine 10 operating in this way can be used to power a vehicle. For an MRV, the liquid salt heat cell 14 is preferably capable of providing 1000 kw of stored energy at a temperature ranging from 650 to 1000° C. Sodium chloride (NaCl), lithium fluoride (LiF) and sodium fluoride (NaF) are all capable of providing 1000 kw of energy between 650 and 1000° C. and NaF appears to be the best compromise between reducing the amount or weight of salt required to provide 1000 kw of energy while also minimising the cost. Approximately 2.97 tonnes of NaF is capable of satisfying the aforementioned design requirements of a liquid salt heat cell for an MRV.

It is expected that the reciprocating engine 10 of FIG. 1 would be capable of producing an output of approximately 100 kw. While such an output is capable of powering an MRV, it is advantageous that an MRV be powered by a power source providing a larger output than this. The gas turbine engine 22 of FIG. 2 is capable of producing an output of approximately 236 kw and is therefore presently the preferred power source for powering an MRV.

It is preferred that the reciprocating engine operates in accordance with the sterling engine and includes an isothermal compression, constant volume heating, isothermal expansion and constant volume cooling in accordance with a carnotcycle with the work output from the reciprocating engine being measured by the area enclosed by the cycle on a pressure-volume diagram.

Figure 2:
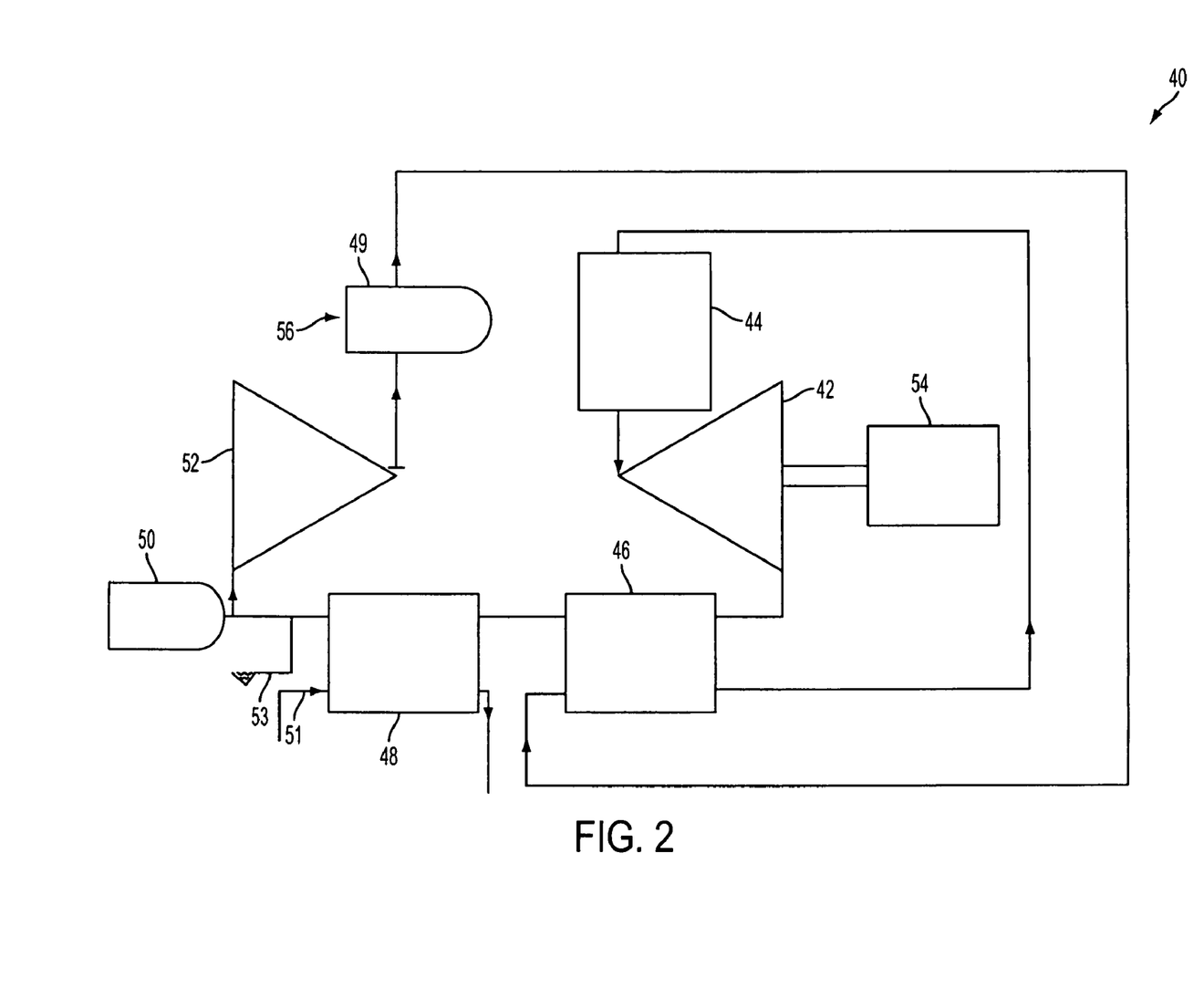
FIG. 2 is a schematic flow diagram of one example of a gas turbine engine of the present invention.

Referring to FIG. 2, a humid gas turbine engine 40 generally comprises a gas turbine 42, a NaF heat cell and associated heat exchanger 44, a recuperator 46, a gas to liquid heat exchanger 48, a humidifier 49, a gas flowrate control valve 50 and a compressor 52. The gas turbine engine 40 is a closed cycle gas turbine engine; exhaust gas exiting the gas turbine 42 is channelled into the compressor 52 which then pumps the exhaust gas back into the inlet side of the gas turbine 42. The compressed helium gas which is pumped by the compressor 52, from the compressor 52 to the inlet side of the gas turbine 42, passes firstly through the humidifier 49, then through the recuperator 46, and finally through the NaF heat cell and associated heat exchanger 44, enroute the gas turbine 42. The gas which is pumped through the gas turbine engine 40 is Helium. The compressor 52 is designed to compress the exhaust gas in accordance with the ratio 15:1.

The recuperator 46 is essentially a heat exchanger which functions to transfer heat from the exhaust gas to the compressed gas which is subsequently pumped through the heat exchanger that is associated with the NaF heat cell. The temperature of the exhaust gas which exists the gas turbine 42 is approximately 470° C. The temperature of the gas exiting from the compressor 52 is approximately 400° C. The humidifier 49 decreases the temperature of the gas exiting the compressor 52 to approximately 195° C. and the recuperator 46 raises the temperature of the compressed gas to approximately 400° C. prior to it passing through the heat exchanger that is associated with the NaF heat cell.

Pumping of compressed gas through the heat exchanger that is associated with the NaF heat cell results in the temperature of the compressed gas being raised to a temperature of approximately 930° C.

After the exhaust gas passes through the recuperator 46 it is at a temperature of approximately 200° C. The exhaust gas is therefore required to pass through the gas to liquid heat exchanger 48 to reduce the temperature of the exhaust gas prior to it passing through the compressor 52. The gas to liquid heat exchanger 48 reduces the temperature of the exhaust gas to approximately 30° C. Cooling water 51 is pumped through the gas to liquid heat exchanger 48.

The gas flowrate control valve 50 is positioned between the gas to liquid heat exchanger 48 and the compressor 52. The gas flowrate control valve 50 can be operated to throttle the gas turbine engine 40 by restricting the flow of gas to the gas turbine 42. The gas flowrate control valve 50 is a vacuum/pressure pump which is modulated by a control system. Distilled water 53 is condensed out of the gas after it exits the gas to liquid heat exchanger 48 and before it passes through the gas flowrate control valve 50.

As explained above, the gas flowrate control valve 50 can be used to decrease or increase power output 54 from the gas turbine 42. However, the power output 54 of the humid gas turbine engine 40 is impaired if this method is used. By controlling the flowrate 56 of distilled water into the humidifier 49, it is expected that the power output 54 will be able to be controlled without adversely effecting the power output 54 of the gas turbine engine 40. A proportional integral differential (P.I.D.) controller would be suitable for controlling the flowrate 56 of the distilled water into the humidifier 49. The P.I.D. controller could control the flowrate of distilled water 56 in proportion to the gas flowrate control of the gas flowrate control valve 50 so that the power output 54 is controlled via both the gas flowrate control valve 50 and the P.I.D. controller.

According to another embodiment of the present invention a fluid may be injected into the humidifier 49 with the selection of the fluid made to maximise the amount of heat which is able to be stored as latent heat as a part of the process of changing state from a solid to liquid and/or liquid to gas.

In order to lower the temperature of exhaust gas entering the compressor 52 it is also envisaged that the gas to liquid exchanger 48 be modified to include a pressurisation step which is able to lower the temperature of the exhaust gas further. This may entail using a venturi arrangement at the outlet of the heat exchanger 48. In such a situation it is possible to dispense with the flow rate control valve 50.

It is preferred that the gas turbine operate in accordance with the rate and cycle but in a modified form.

Although the preferred embodiment of the invention has been described in relation to $H2_o$ it is also possible to use other fluids such as ammonia.

An Allison T63-A-700 (250-C18) gas turbine which produces an output of approximately 236 kw can be used to drive an MRV. The estimated efficiency of the above described gas turbine engine 40 is approximately 37%. The NaF heat cell is preferably capable of providing 1000 kw of stored energy for the purpose of transferring heat to the compressed gas at a temperature ranging from 650 to 1000° C. As explained above in relation to the reciprocating engine 10, 2.97 Tonnes of NaF is therefore required. The Allison gas turbine is connected to a gearbox which has a step down ration of approximately 6:1 (35000 RPM to 6000 RPM) which in turn is connected to a wobble plate type hydraulic pump which is designed to transfer power to tracks or wheels of the MRV through a series of hydraulic motors.

Figure 3:
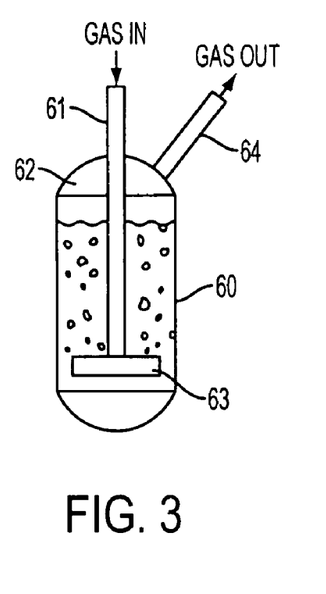
FIG. 3 shows an illustration of a heat cell according to one embodiment of the invention.

FIG. 3 shows a heat cell in accordance with one embodiment of the present invention. The heat cell 60 has a generally cylindrical shape with a gas inlet 61 through a top section 62. The gas inlet 61 is a cylindrical conduit which extends through the centre of the container 60 and at the bottom thereof branches at 90° into conduit 63 having openings at each end.

The container is filled with a high temperature salt which is heated to a molten state. The container is made from a ceramic material which is able to substantially prevent all heat from escaping from inside of the container.

A gas outlet 64 extends from the top section 62 of the container 60.

In operation a gas is pumped through the conduit 61 and exits through the ends of conduit 63 into the bottom of the container 60. The gas, which is under pressure, bubbles through the molten salt which may be lithium chloride and in the process absorbs heat. The gas then leaves through the gas outlet 64 at a considerably higher temperature.

The gas bubbling through the molten salt unit is in direct contact with the molten salt. This is in contrast to existing heat cells where heat must pass through a metal barrier in form of the heat exchange tubing.

It is expected that the heat transfer of the direct contact bubbling unit would be in the vicinity of a few hundred times higher than conventional indirect contact tube heat exchangers. Furthermore it is expected that the cost of production of such a heat storage device would be significantly less than that of conventional heat storage devices.

Because heat exchange tubing is not required the size of the heat cell can also be reduced.

According to another embodiment of the invention gas may be bubbled through the molten salt using alternative gas discharging methods.

The invention claimed is:

1. A closed cycle gas turbine system comprising a compressor for producing compressed gas, a gas turbine for receiving the compressed gas, a heat cell having a first heat transfer means and adapted to receive the compressed gas from the compressor, heat the compressed gas and transfer the compressed gas to the gas turbine and a second heat transfer means for receiving exhaust gas from the gas turbine and transmitting it to the compressor and wherein the second heat transfer means is adapted to transfer at least some heat from the exhaust gas prior to it being transferred to the compressor.

2. The closed cycle gas turbine system as claimed in claim 1 wherein the second heat transfer means is adapted to transfer heat from the exhaust gas to the compressed gas prior to the compressed gas being received by the first heat transfer means.

3. The closed cycle gas turbine system as claimed in claim 2 wherein the second heat transfer means comprises a recuperator.

4. The closed cycle gas turbine system as claimed in claim 3 including a humidifier connected between an output of the compressor and an input of the heat cell to transfer compressed gas therebetween.

5. The closed cycle gas turbine system as claimed in claim 4 wherein the humidifier is adapted to decrease the temperature of gas exiting the compressor prior to it being transferred to the recuperator.

6. The closed cycle gas turbine system as claimed in claim 5 wherein the recuperator is adapted to raise the temperature of gas received from the humidifier.

7. The closed cycle gas turbine system as claimed in claim 6 including a controller for controlling flow rate of liquid to the humidifier.

8. The closed cycle gas turbine system as claimed in claim 7 including a gas to liquid heat exchanger located between an output of the recuperator and an input of the compressor to thereby reduce the temperature of exhaust gas prior to its transfer to the compressor.

9. The closed cycle gas turbine system as claimed in claim 8 including a gas flow rate control valve which is adapted to control flow of exhaust gas to the gas turbine.

10. The closed cycle gas turbine system as claimed in claim 9 wherein the controller includes a proportional integral differential (PID) controller which controls liquid into the humidifier based on flow rate of exhaust gas through the control valve.

11. A vehicle having an engine including a closed cycle gas turbine system comprising a compressor for producing compressed gas, a gas turbine for receiving the compressed gas, a heat cell having a first heat transfer means and adapted to receive the compressed gas from the compressor and transfer the compressed gas to the gas turbine, a second heat transfer means for receiving exhaust gas from the gas turbine and transferring it to the compressor and wherein the second heat transfer means is adapted to transfer at least some heat from the exhaust gas prior to it being transferred to the compressor.

12. The vehicle as claimed in claim 11 wherein the second heat transfer means is adapted to transfer heat from the exhaust gas to the compressed gas prior to it being received by the heat cell.

13. The vehicle as claimed in claim 12 wherein the closed cycle gas turbine system includes a humidifier which is adapted to receive compressed gas from the compressor and transfer the compressed gas to the heat cell via the second heat transfer means.

14. A closed cycle gas turbine system as claimed in claim 1 wherein the heat cell comprises a heat cell.

15. The closed cycle gas turbine system as claimed in claim 14 wherein the compressor of the gas turbine engine is arranged to compress the gas according to the ratio of 6.2:1.

16. The closed cycle gas turbine system as claimed in claim 1 wherein the heat cell and associated first and second heat transfer means are arranged to maintain the temperature of gas entering the gas turbine at a substantially constant temperature of 930° C.

17. The closed cycle gas turbine system as claimed in claim 15 wherein the heat cell and associated first and second heat transfer means are arranged to maintain the temperature of gas entering the gas turbine at a substantially constant temperature of 930° C.

18. The closed cycle gas turbine system as claimed in claim 1 wherein the gas turbine comprises a humid gas turbine engine which includes liquid injection means for injecting liquid into the compressed gas after it leaves the compressor and before it is heated by the first and second heat transfer means.

19. The closed cycle gas turbine system as claimed in claim 18 including liquid condensing means for condensing liquid from the exhaust gas prior to it being fed into the compressor.

20. The closed cycle gas turbine system as claimed in claim 19 wherein the liquid is condensed from the exhaust gas before or after the exhaust gas passes through the second heat transfer means.

21. The closed cycle gas turbine system as claimed in claim 20 wherein liquid injected by the liquid injection means is selected so that the second heat transfer means reduces the temperature of the exhaust gas to substantially ambient temperature prior to it passing into the compressor, without the use of the second heat transfer means.

22. The closed cycle gas turbine system as claimed in claim 21 wherein the compressor is arranged to compress the gas according to a ratio greater than or equal to 15:1.

23. The closed cycle gas turbine system as claimed in claim 21 wherein the compressor is arranged to compress the gas according to a ratio of less or equal to approximately 30:1.

24. The closed cycle gas turbine system as claimed in claim 22 wherein the compressor and first heat transfer means are arranged so that the temperature of the compressed gas exiting the compressor is substantially 400° C. and so that the liquid injection means reduces the temperature of the compressed gas to approximately 195° C.

25. The closed cycle gas turbine system as claimed in claim 23 wherein the compressor and first heat transfer means are arranged so that the temperature of the compressed gas exiting the compressor is substantially 400° C. and so that the liquid injection means reduces the temperature of the compressed gas to approximately 195° C.

26. The closed cycle gas turbine system as claimed in claim 1 wherein the gas includes any one of air, ammonia, argon, carbon dioxide, carbon monoxide, helium, hydrogen, methane, oxygen or water vapour.

27. The closed cycle gas turbine system as claimed in claim 26 wherein the second heat transfer means is arranged to decrease the temperature of exhaust gas to approximately 200° C. and increase the temperature of gas exiting the compressor to approximately 400° C.

28. The closed cycle gas turbine system as claimed in claim 27 wherein the second heat transfer means includes a tertiary heat exchanger including liquid cooling means for passage of cooling liquid through the tertiary heat exchanger for removal of heat from the exhaust gas.

29. The closed cycle gas turbine system as claimed in claim 28 wherein the controller is arranged to control the power output of the gas turbine system by controlling both the flow rate of the gas flowing through the gas turbine and the flow rate of the liquid which is injected to the compressed gas by the liquid injection means.

30. A closed cycle gas turbine system as claimed in claim 1 wherein the heat cell comprises a container having an inlet, an outlet, a heat storage substance and a heat transfer means which is adapted to transfer fluid into the container whereby the fluid is able to pass through the heat storage substance and exit through the outlet.

31. A closed cycle gas turbine system as claimed in claim 30 wherein the gas is adapted to bubble through the heat storage substance.

32. A closed cycle gas turbine system as claimed in claim 31 wherein the heat storage substance is a molten salt compound.

33. A closed cycle gas turbine system as claimed in claim 32 wherein the heat transfer means includes a conduit which extends to a bottom region of the container and has outlet openings to enable discharge of the gas therefrom into the heat storage substance.

* * * * *